UNITED STATES PATENT OFFICE.

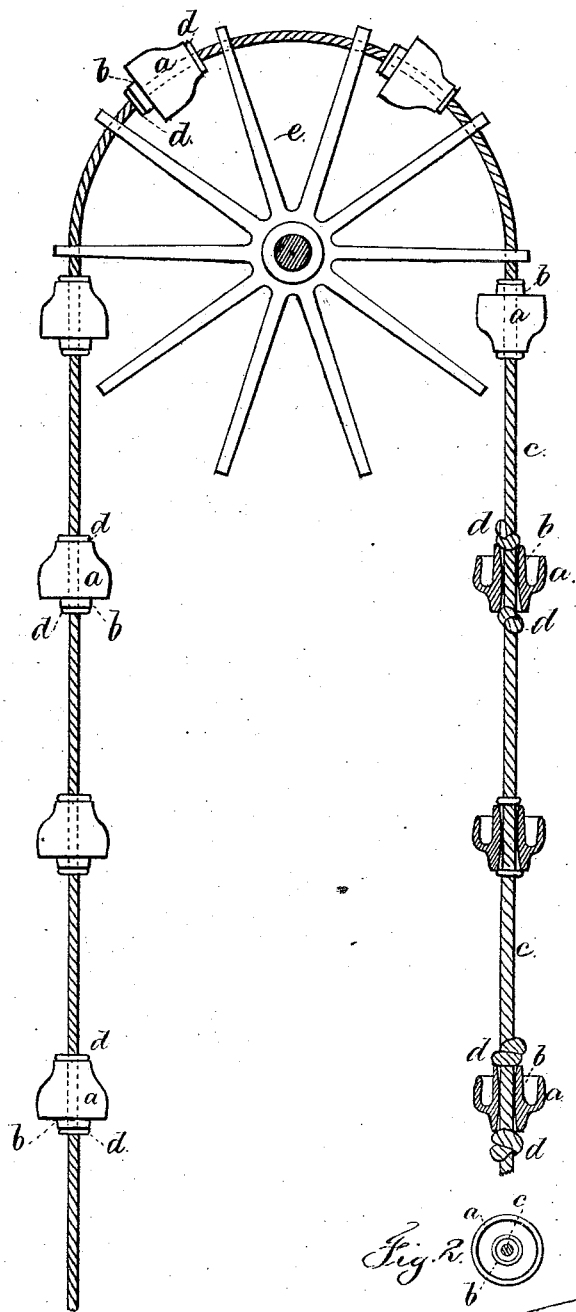

HENRY PORT, OF STAPLETON, NEW YORK.

IMPROVEMENT IN BUCKET-ELEVATORS.

Specification forming part of Letters Patent No. 157,135, dated November 24, 1874; application filed April 9, 1874.

*To all whom it may concern:*

Be it known that I, HENRY PORT, of Stapleton, in the county of Richmond and State of New York, have invented a new and useful Improvement in Bucket-Elevators; and the following is declared to be a correct description of the same.

I am aware that bucket-elevating apparatus or chains of pots for raising water and other articles have been used, and said pots have usually been made of iron and attached together by ordinary chains, or by links of any desired length, said apparatus passing over and being supported by a wheel.

My invention consists in a cup-shaped bucket formed with a tubular central hole, through which the chain or endless belt is passed. The buckets are preferably of glass; but any desired material may be used. These cups or buckets are strung upon the rope, chain, or band at the proper intervals by passing the same through the central hole of the bucket; and if the belt is a rope, the buckets may be secured in place by knots tied above and below each, or any suitable means may be employed for that purpose. By constructing the buckets in this manner, they are readily and securely attached to the chain or rope.

In the drawing, Figure 1 shows an elevation and partial section of a chain of buckets as passing over a wheel, and Fig. 2 is a plan of one of the buckets.

*a* is the bucket, of suitable size. *b* is the tubular center, through which the rope or belt *c* is passed. *d* are the knots made in the rope, for the purpose of fastening the buckets on the same; and the apparatus passes over the wheel *e*, which wheel may be of any usual form, and revolved by a crank or otherwise.

The buckets may be placed at any desired distances apart, and may be used for elevating water or other liquid, or any desired material.

I claim as my invention—

A bucket for water-elevators, cup-shaped, and having a tubular central hole for the rope or chain, as set forth.

Signed by me this 7th day of April, A. D. 1874.

HENRY PORT.

Witnesses:
GEO. T. PINCKNEY,
CHAS. H. SMITH.